US012789425B2

(12) United States Patent
Jamond et al.

(10) Patent No.: US 12,789,425 B2
(45) Date of Patent: Nov. 10, 2026

(54) MOLDING APPARATUS AND METHOD FOR EMBOSSING A RAW MATERIAL

(71) Applicant: ASTRAVEUS, Paris (FR)

(72) Inventors: Nicolas Jamond, Senlisse (FR); Jérémie Laurent, Villeurbanne (FR)

(73) Assignee: ASTRAVEUS, Paris (FR)

( * ) Notice: Subject to any disclaimer, the term of this patent is extended or adjusted under 35 U.S.C. 154(b) by 167 days.

(21) Appl. No.: 17/916,280

(22) PCT Filed: Apr. 3, 2020

(86) PCT No.: PCT/EP2020/059685

§ 371 (c)(1),
(2) Date: Sep. 30, 2022

(87) PCT Pub. No.: WO2021/197640

PCT Pub. Date: Oct. 7, 2021

(65) Prior Publication Data

US 2023/0145770 A1 May 11, 2023

(51) Int. Cl.
*B29C 43/56* (2006.01)
*B29C 43/10* (2006.01)
(Continued)

(52) U.S. Cl.
CPC .............. *B29C 43/56* (2013.01); *B29C 43/10* (2013.01); *B29C 43/3607* (2013.01);
(Continued)

(58) Field of Classification Search
CPC ................ B29C 43/10; B29C 43/3607; B29C 2043/3647; B29C 2043/3652; B29C 2043/522; B29C 59/022; B29C 43/52
See application file for complete search history.

(56) References Cited

U.S. PATENT DOCUMENTS 1,191,296 A * 7/1916 Gammeter ........... B29D 30/065
425/34.3
2001/0039701 A1 11/2001 Lines et al.
(Continued)

FOREIGN PATENT DOCUMENTS

EP 1244939 A1 10/2002
EP 2889895 A1 7/2015
(Continued)

OTHER PUBLICATIONS

WO2019001977 machine translation (Year: 2019).*
(Continued)

*Primary Examiner* — Alison L Hindenlang
*Assistant Examiner* — Alexander A Wang
(74) *Attorney, Agent, or Firm* — Maier & Maier, PLLC

(57) ABSTRACT

This molding apparatus is intended for the manufacturing of a molded article from a raw material intended to be arranged in a first region of an embossing chamber of the molding apparatus. The embossing chamber includes a mold and a counter-mold, the molds being arranged on two opposite sides of the first region. The molding apparatus further includes a second chamber having a common wall with the embossing chamber and a pressurization system configured to generate a predefined pressure differential between the embossing chamber and the second chamber, the common wall including at least one embossing actuator, the embossing actuator being configured to generate a movement of at least one of the molds so as to mold the raw material when a predefined pressure differential is applied.

17 Claims, 8 Drawing Sheets

(51) Int. Cl.

| | |
|---|---|
| ***B29C 43/36*** | (2006.01) |
| ***B29C 43/52*** | (2006.01) |
| ***B29C 59/02*** | (2006.01) |
| *B29C 43/02* | (2006.01) |
| *B29C 43/32* | (2006.01) |

(52) U.S. Cl.

CPC ............ *B29C 43/52* (2013.01); *B29C 59/022* (2013.01); *B29C 2043/025* (2013.01); *B29C 2043/3233* (2013.01); *B29C 2043/562* (2013.01); *B29C 2059/023* (2013.01)

(56) References Cited

U.S. PATENT DOCUMENTS

| | | | |
|---|---|---|---|
| 2010/0015271 | A1 | 1/2010 | Yang et al. |
| 2014/0239529 | A1 | 8/2014 | Tan et al. |
| 2015/0298368 | A1 | 10/2015 | Krahnert et al. |

FOREIGN PATENT DOCUMENTS

| | | | |
|---|---|---|---|
| JP | 2003533001 | A | 11/2003 |
| JP | 2008155521 | A | 7/2008 |
| KR | 1020040078590 | A | 9/2004 |
| WO | 0142858 | A1 | 6/2001 |
| WO | 2010050679 | A2 | 5/2010 |
| WO | WO2019001977 | * | 1/2019 |

OTHER PUBLICATIONS

International Search Report and Written Opinion issued on Jun. 19, 2020 in corresponding International Patent Application No. PCT/EP2020/059685; 13 pages.

* cited by examiner

MOLDING APPARATUS AND METHOD FOR EMBOSSING A RAW MATERIAL

FIELD OF INVENTION

The invention relates to the field of micro-embossing apparatus and methods. More precisely, the field of the invention is microthermoforming, such as plate-to-plate micro hot-embossing techniques and apparatus, or more particularly to vacuum assisted plate-to-plate micro hot-embossing with pressure forces multiplication and auto-leveling features.

BACKGROUND OF INVENTION

"Thermoforming" means shaping of heated and therefore softened semi-finished products in the form of thermoplastic polymer films or plates with their edges fixed by three-dimensional stretching. "Microthermoforming" is the abbreviation for microscopic or microscale thermoforming, or, more precisely, for thermoforming of microproducts or microstructure products. "Microstructure products" means products that have structures in the micrometric range and have their technical function provided by the shape of the microstructure.

In such thermoforming techniques, shaping is carried out mainly by forming films or plates into female molds (negative forming) or over male molds (positive forming).

Other techniques also exist. For instance, polymer microreplication may be obtained by processes such as micro injection molding primary forming processes where forming occurs already in a molten, liquid phase of the heated polymer material.

Microthermoforming is a forming process where forming occurs in a strongly softened, but still solid phase of the heated polymer.

One advantage of microthermoforming processes is that the thermoformed microparts have additional specific properties appearing only in microscale dimensions and resulting from their unusual morphology. In particular, thermoformed microfluidic structures may exhibit microcavities, such as channels and reservoirs, having thin walls with thicknesses as low as a few micrometers. Specific properties of thermoformed microparts are, amongst others, their high flexibility, their small volume and mass, their low thermal resistance and heat capacity, and their low light absorbance and background fluorescence.

Other advantages of microthermoforming processes are that modifications of the film to be formed remain preserved beyond the forming step due to the material coherence. This enables surface and bulk modification and functionalization of the three-dimensionally formed films or membranes, namely as highly resolved micropatterns and nanopatterns. Another advantage is that patterns may be generated on all sides of a three-dimensionally formed film, i.e. on hardly accessible side walls and even behind undercuts. Thus, e.g. thermoformed chips for three-dimensional cell cultivation can be provided with pores, cell adhesion patterns, surface topologies and electrodes.

Molds for polymer microreplication in general and, in particular, for microthermoforming can be fabricated by various methods such as mechanical micromachining, lithographic based methods in combination with electroplating, also called 'LIGA' process, and wet or dry etching.

One way to perform microthermoforming process applied to a sheet of polymer is the "hot embossing" process which relies on raising the temperature of a sheet of polymer just above its glass transition temperature and pressing a heated master plate into the polymer to trigger a local flow of the material so as to fill the cavities to be replicated. This technique has attracted increased attention in recent years in particular due to the relatively simple setup and low cost associated with its implementation in comparison to other replication techniques. Relatively high aspect ratio features can be replicated with hot embossing in a wide range of structure sizes, from several hundred micrometers down to several nanometers.

Different hot embossing techniques exist. Three types of micro hot embossing including plate-to-plate, roll-to-plate and roll-to-roll, have been successively developed to meet the increasing demand for large-area patterned polymeric films.

Regarding the plate-to-plate hot embossing, this technique relies on performing hot embossing by applying pressure with a movable plate facing a fixed one. This technique involves using specific apparatus which are, however, commercially available and routinely used in industry every day. Furthermore, several innovations such as rubber-assistance, ultrasonic-assistance and gas-assistance have been proposed in micro hot embossing to improve the efficiency, uniformity and replication rate based on the conventional plate-to-plate method.

One problem remaining with these conventional hot embossing techniques is that the precision of the system may lead to inhomogeneity and distortion of the molded features of the created structure. Indeed, when hot embossing is conducted, upper and lower molds are generally used in fixed position, thus alignment and parallelism are set at the time of installation. However, in the range of micrometers, the influence of alignment and parallelism has become significant. In a such configuration with fixed molds, the molding parts may be subject to adverse positioning because of misalignment of the molds at the installation.

In addition, conventional hot embossing generally uses hydraulic system and sturdy and bulky elements in order to transmit the force needed for embossing. It results in relatively heavy and voluminous equipment. Moreover, conventional hot-embossing use a hydraulic system developing high forces, up to several tons, as such, this kind of equipment has an intrinsic risk of injury for the user by pinching body parts in the moving parts.

Furthermore, with conventional hot embossing, some gas pockets may be trapped between the mold features and the thermoplastic layer. Possibly, the gas pockets may not be drained during the embossing and lead to improperly molded features or gas bubble inclusion in embossed parts.

Nevertheless, vacuum assisted hot embossing is an alternative of the plate-to-plate hot embossing in which the force is not applied by a moving a plate but rather by a hydrostatic pressure directly on the thermoplastic substrate. Usually, the thermoplastic substrate may be a thin layer thermally softened by radiation and held above the mold by lateral clamps. In this technique, vacuum is made on one side of the thermoplastic substrate, in the mold region, for example, with atmospheric or higher pressure being set on the other side of the thermoplastic substrate.

Some solutions using vacuum assisted hot-embossing techniques are described, for example in patent applications CN1624586A or EP 1 244 939 A1.

One problem of these vacuum assisted hot-embossing techniques is their incompatibility with the use of a rigid counter-mold to form features on both sides of the part. In practice, it is difficult to form features on both sides of a part sequentially, in good alignment and without damaging the features formed first. This problem is an important limitation. Another problem of these vacuum assisted hot-embossing techniques is that they cannot reach high embossing pressures, which leads to increased embossing times and reduced thickness of the parts that can be manufactured. Vacuum assisted hot-embossing techniques generally use a relatively thin thermoplastic layer to be embossed, as an interface between the pressure differential. Then, the maximum pressure applied to the embossed layer is equal to the pressure differential between the vacuum being generated on one side of the thermoplastic layer and the pressure applied on the other side of the thermoplastic layer. Thus, conventional vacuum embossing using atmospheric pressure is limited to about 1 bar of embossing pressure, which increases embossing times and prevents the embossing of thick thermoplastic layers.

Thus, there is a need for an embossing technique for various type of raw materials using a compact solution and ensuring elimination of gas pockets and misalignment of molds.

SUMMARY

For this purpose, a subject of the invention is a molding apparatus for manufacturing a molded article from a raw material intended to be arranged in a first region of an embossing chamber of said molding apparatus, said embossing chamber comprising a mold and a counter-mold, the mold and counter-mold being arranged on two opposite sides of the first region, the mold being mobile along an embossing axis within the embossing chamber, wherein the molding apparatus comprises an actuation chamber having a common wall with the embossing chamber, both the embossing chamber and the actuation chamber being gas tight and able to, both simultaneously, sustain and maintain low inside pressures and/or inside vacuum, wherein the molding apparatus further comprises a pressurization system configured to generate a predefined pressure differential between the embossing chamber and the actuation chamber, wherein said common wall comprises at least one embossing actuator, said embossing actuator comprising a mobile member, said mobile member being a rigid plate displaying a first surface which is part of the embossing chamber and is connected to the mold and a second surface, opposite to the first surface, which is part of the actuation chamber, the embossing actuator being configured to generate a movement of the mold so as to mold the raw material when a predefined pressure differential is applied between the embossing chamber and the actuation chamber, wherein the mold displays a molding surface aimed at cooperating with the counter-mold during the molding of the raw material and a connection surface connected to the first surface of the embossing element, the molding surface of the mold projected along the embossing axis being smaller than the second surface of the embossing actuator projected along the same embossing axis.

According to an embodiment, the molding apparatus comprises mechanical locking and sealing means aimed at keeping the apparatus closed while the pressure inside the actuation chamber is higher than the pressure inside the embossing chamber.

The sealing means could comprise an inflatable joint.

According to another embodiment, an embossing pressure exerted by the mold on the counter-mold during an embossing is greater than 5 bars, preferably greater than 20 and more preferably greater than 50 bars.

According to another embodiment, an actuation system enables the movement of the actuation chamber in a position where the mold it is not facing the counter-mold along the embossing direction and thus enables an easier recovery of the molded articles by an access along the embossing direction.

Further, the embossing actuator could comprise at least one deformable part, said deformable part being deformed by the application of the predefined pressure differential and allowing a movement of the mobile member, said at least one deformable part being arranged so as to provide a parallelism self-correction function of at least one of the molds.

The embossing actuator could comprise clamping means allowing to keep the mold integral with the mobile member.

According to a further embodiment, the molding apparatus comprises:

- a heating element configured to transfer thermal energy to the raw material; and
- a cooling element configured to absorb thermal energy from the raw material.

The embossing chamber may display a first frame and the actuation chamber may display a second frame, the mold being affixed to the first frame and the counter-mold being affixed to the second frame, the apparatus comprising a thermal insulation between the mold and counter-mold and the frames to which they are respectively affixed.

The apparatus may comprise a first and a second heating element, the first heating element being coupled to the mold and the second heating element being coupled to the counter-mold.

The apparatus may comprise a first and a second cooling elements, the first cooling element being coupled to the mold and the second cooling element being coupled to the counter-mold.

In one embodiment, heating thermal energy may be transmitted simultaneously by conduction through the mold and the counter-mold and cooling thermal energy is transmitted by conduction through the mold and counter-mold.

According to one embodiment, the embossing actuator comprises at least one mobile member moving in a predefined direction, along the embossing axis, said embossing axis being perpendicular to the plane of the common wall.

According to one embodiment, the embossing actuator comprises at least one deformable part said deformable part being deformed by the application of the predefined pressure differential and inducing a movement of the mobile member, said at least one deformable part being arranged so as to ensure a parallelism self-correction function of at least one of the molds.

According to one embodiment, the deformable part comprises at least a flexible membrane or flexible hinge.

According to one embodiment, the embossing actuator comprises a clamping or fixture means allowing to keep the mold integral with the mobile member.

According to one embodiment, the molding apparatus comprises at least one pressure measurement device arranged in a chamber.

According to one embodiment, the pressurization system comprises:

- an atmospheric regulator configured to generate an atmospheric pressure inside the embossing chamber;
- an atmospheric regulator configured to generate an atmospheric pressure inside the actuation chamber;
- a pressure regulator configured to regulate the pressure inside the embossing chamber;

a pressure regulator configured to regulate the pressure inside the actuation chamber; and/or at least one vacuum pump coupled to an electro-valve and configured to generate inside at least one chamber a vacuum or a pressure close to the vacuum pressure.

According to one embodiment, the pressurization system comprises:

a valve connecting the embossing chamber to a pressure source;

a valve connecting the embossing chamber to a vacuum source:

a valve connecting the actuation chamber to a vacuum source;

a valve connecting the actuation chamber to a pressure source.

According to one embodiment, heating thermal energy is transmitted by conduction through the mold and cooling thermal energy is transmitted by conduction through the counter-mold.

Another subject of the invention is a method for embossing a raw material by means of the molding apparatus which may display any one of the preceding features, said method comprising the following steps:

loading (LOAD) a raw material on the top of the surface of a first mold, said first mold being arranged in an actuation chamber, said actuation chamber comprising a common wall with an embossing chamber;

depressurizing (DEPRES) the actuation chamber when the pressure in the actuation chamber is greater than a predefined threshold;

depressurizing (DEPRES) the embossing chamber when the pressure in the embossing chamber is greater than a predefined threshold;

increasing (INCREA) the pressure in the actuation chamber until it reaches a predefined limit, said predefined limit being superior to the pressure in the embossing chamber, said predefined limit being configured to generate a predefined embossing force;

decreasing (DECREA) the pressure in the actuation chamber to a value equal or inferior to the pressure in the embossing chamber;

increasing the pressure in the embossing chamber until it reaches the ambient pressure;

optionally, increasing the pressure in the actuation chamber until it reaches the ambient pressure;

unloading (UNLOAD) molded material from the first mold.

According to one embodiment, the method comprises setting the predefined limit between a first range of 100 mbar and 1 bar or between a second range of 100 mbar and the ambient pressure.

According to a further embodiment, the method comprises:

a heating step wherein the raw material (1) is heated before the depressurization step of the embossing chamber (4);

a cooling step wherein the raw material (1) is cooled after the heating step.

BRIEF DESCRIPTION OF THE DRAWINGS

Features and advantages of the invention will become apparent from the following description of embodiments of a molding apparatus and a method for embossing according to the invention, this description being given merely by way of example and with reference to the appended drawings in which.

DETAILED DESCRIPTION

Apparatus

Figure 1A:
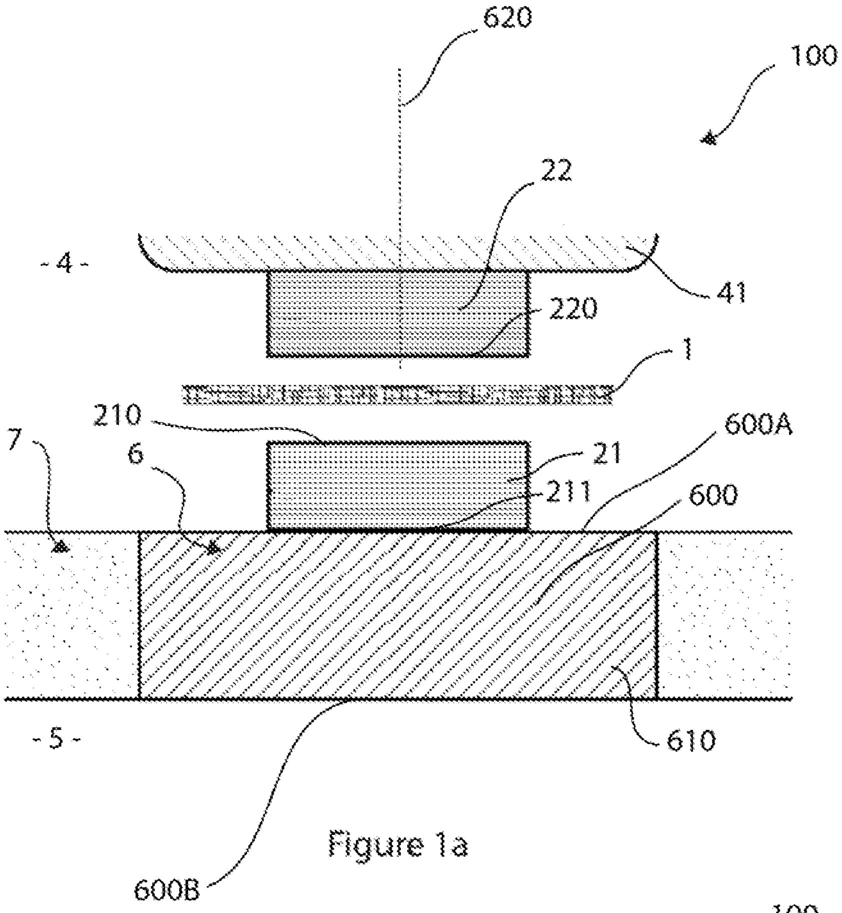
FIG. 1*a* is a schematic representation of a mold and a counter-mold arranged according to one embodiment of an apparatus of the invention.
Figure 1B:
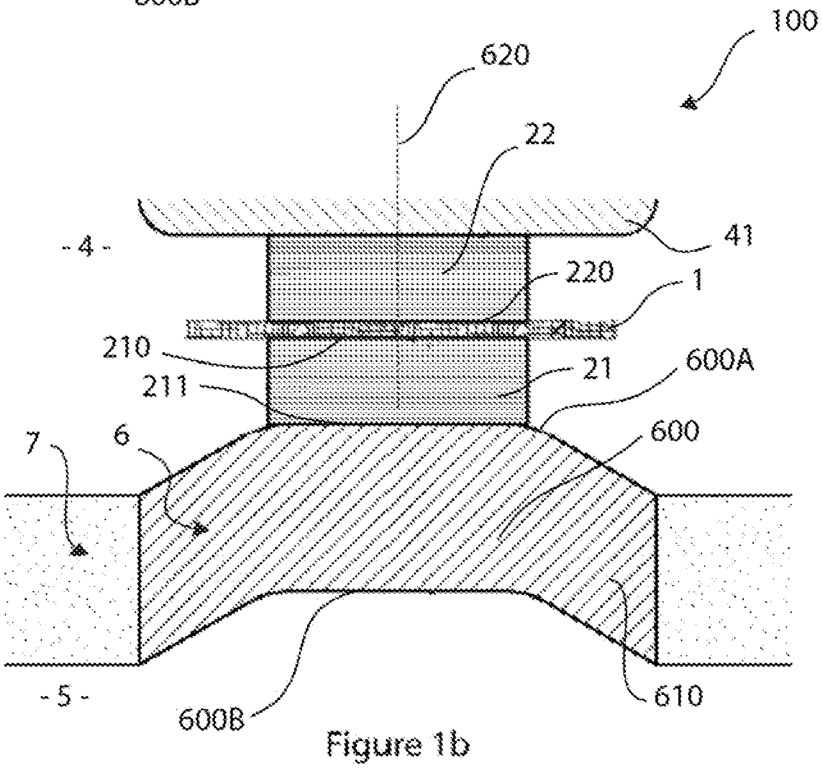
FIG. 1*b* is a schematic representation of a mold and a counter-mold of FIG. 1*a* during an embossing operation.

FIGS. 1*a* and 1*b* are schematic drawings showing part of a molding apparatus 100 according to the invention and focusing on the area where the raw material 1 is intended to be arranged. "Raw material" may also be called "substrate material".

The raw material 1 may be a thermoplastic substrate. It corresponds to the material to emboss. The apparatus of the invention allows embossing any thermoplastic material, such as COC, PMMA, LDPE, HDPE, etc.

In these schematic drawings, an upper mold 22 faces a lower mold 21. The upper mold 22 and the lower mold 21 form two molds cooperating for molding a raw material 1. They may also be described together as a mold 21 and a counter-mold 22. FIG. 1*a* shows the molding apparatus when the two molds 21, 22 are not engaged for pressing the raw material 1.

The mold 21 comprises a mold embossing surface 210 and the counter-mold 22 comprises a counter-mold embossing surface 220 which aims to cooperate for shaping a raw material 1.

For applications for which only one side of the raw material 1 has to be embossed, the upper mold 22 is flat and polished, in order to avoid warping or roughening of the substrate.

The lower mold 21 exhibits three-dimensional features at its embossing surface 210 in order to emboss, for example, a thermoplastic substrate. According to one embodiment, the lower mold 21 is the one bearing the three-dimensional features. Most polymers have higher thermal coefficient than metals, as a result, when the heated substrate flows down in the mold 21, the obtained embossed substrate is likely to be "stuck" on the features of the mold after cooling.

In another embodiment, both molds 21, 22 comprise features configured to imprint both sides of the raw material 1. In this situation, according to one example, the embossed volume is higher on the lower mold 21 than on the upper mold 22. One advantage is to guarantee that the raw material 1 is stuck preferentially on the lower mold 21.

In one embodiment, the molds 21, 22 are made by micromachining, lithography or electroplating. One advantage is to use these molds for micro hot-embossing applications. They are, for instance, made of a metal such as copper, brass or steel. For hot-embossing applications, alloys having a high thermal conductivity are preferable.

FIG. 1*b* is a schematic depiction of the molding apparatus 100 represented in FIG. 1*a* when the two molds 21, 22 press the raw material 1 in order to shape it to generate a molded article.

In one embodiment, the surfaces of the mold 21 and the counter-mold 22 comprises self-alignment geometric features. Complementary positive and negative pyramids may be arranged on the embossing surface 210 of both molds 21, 22. Each couple of aligned positive and negative pyramids cooperates as complementary geometric forms.

Alternatively, or in combination, the mold 21 and counter-mold 22 may bear geometric self-alignment features aligned along the embossing direction 620. These self-alignment features may be designed outside of the contour of the raw material 1 or aligned along the embossing direction 620 through holes designed in the area where the raw material 1 is arranged.

A common wall 7 separates an upper chamber, called embossing chamber 4, from a second chamber, called actuation chamber 5. Thus, the apparatus 100 of the invention comprises an actuation chamber 5, an embossing chamber 4 and a common wall 7 that is shared by the two chambers 4, 5 and separates them. The embossing chamber 4 comprises the mold 21 and the counter-mold 22. The counter mold 22 is stationary within the embossing chamber 4 and the mold 21 is mobile along the embossing axis 620 within the embossing chamber 4.

The embossing chamber 4 may have a depth lower than that of the actuation chamber 5.

Each chamber 4, 5 is made of a rigid sturdy material, such as metal alloys, strong plastics, composite materials.

The common wall 7 comprises an embossing actuator 6 generating a movement and/or a deformation of at least one element of the common wall 7 in order to engage the mold 21 in a predefined direction, along an embossing axis 620, said direction being called "embossing direction". This embossing direction 620 is perpendicular to the plane comprising the upper mold 22. The embossing actuator 6 is configured to generate a movement of the mold 21 so as to mold the raw material 1 when a predefined pressure differential is applied within the actuation chamber 5.

Thus, the apparatus of the invention comprises two chambers: the embossing chamber 4 and the actuation chamber 5. Some examples of these chambers are represented in FIGS. 3*a*, 3*b*, 4*a*, 4*b*, 5*a*, 5*b*.

The embossing chamber 4 is the part of the apparatus where the raw material embossing is performed. According to one example, embossing is realized under vacuum. This way of embossing reduces the risk of gas interfering during the embossing process.

In several embodiments shown on FIGS. 2*a*, 2*b*, 3*a*, 3*b*, 4*a*, 4*b*, 5*a* and 5*b*, this common wall 7 comprises an opening 71 in which the embossing actuator 6 is positioned.

The embossing actuator 6 is designed to move or deform under the effect of the pressure difference between the two chambers 4 and 5. The objective is to pressurize the stack comprising the mold 21, the raw material 1 and counter-mold 22 to perform embossing. The movement of the embossing actuator 6 resulting from the variation of the pressure difference between chambers 4 and 5 is called embossing movement and its average direction corresponds to the embossing direction 620, along the embossing axis 620.

When the pressure difference between the actuation chamber 5 and the embossing chamber 4 is over a predefined threshold, the mold 21 is therefore actuated so as to pressurize the raw material 1 against counter-mold 22. The self-alignment geometric features, if any, and the deformability of the raw material 1 ensure an aligned pressurization between the mold 21 and counter-mold 22.

As can be seen on each illustration, regardless of the embodiment, the embossing actuator 6 comprises a mobile member 600. In those embodiments, said mobile member 600 is a rigid plate.

The meaning of the term "plate" is taken in a broad sense and the mobile member 600 can display any kind of shapes like a pyramidal shape or a curved shape, for example. In the illustrated embodiments, the mobile member 600 is displaying a first surface 600A when observed from the embossing chamber along the embossing direction and a second surface 600B when observed from the actuation chamber 5 along the embossing direction. The two surfaces 600A, 600B are thus opposite to each other. The two surfaces 600A, 600B may be substantially parallel to each other. The first surface 600A is part of the embossing chamber 4 and is connected to the mold 21. The second surface 600B, which is part of the second chamber 5.

The mobile member 600 supports the mold 21. The mobile member 600 moves along the embossing axis 620, in the embossing direction 620 that is perpendicular to the common wall 7. In the given examples, the embossing direction 620 coincides with the vertical direction.

The mobile member 600 is rigid enough to transmit the forces generated from the pressure differential without significant deformation and without breaking. The thickness of the mobile member is configured according to the pressure differential applied on its surfaces 600A, 600B and to the mechanical properties of the material from which it is made. According to one example, the mobile member 600 may be made in a material based on stainless steel, an aluminum alloy, a titanium alloy. In more sophisticated embodiments the mobile member 600 may have a geometry and composition optimized for load bearing and force transmission in configurations of use at a minimal weight. In addition, pressure applied on the molds 21, 22 can be superior to the pressure differential, by using a mobile member 600 attached to a flexible membrane 610.

Therefore, the common wall 7 comprises at least one deformable element such as a joint 610 allowing a displacement of the mobile member 600.

As already mentioned, the mold 21 displays a molding surface 210 aimed at cooperating with the counter-mold 22 during the molding of the raw material. The mold 21 also displays a connection surface 211 connected to the first surface 600A of the mobile element 600. When projected along the embossing axis 620, the molding surface 210 of the mold 21 is smaller than the projected along the same embossing axis 620 of the second surface 600B of the embossing actuator 600, leading to embossing pressure greater than the pressure differential.

The ratio between the mass of the mobile member 600 and the first surface 600A is preferably inferior to 100 g/cm$^2$ and more preferably inferior to 50 g/cm$^2$. The first surface 600A is defined by the surface of the embossing actuator 6. In one example, the surface of the embossing actuator 6 is the surface of the mobile member 600 projected along the embossing direction 620. One advantage is that these ratios allow high effective pressure multiplication, taking into account weight forces.

The assembly prevents gas leaks between the two chambers 4 and 5, allowing to set and vary a pressure difference between them.

The embossing chamber 4 and the actuation chamber 5 are gas tight and are conceived to sustain and to maintain negative pressure differences with ambient pressure and to sustain and maintain low pressures allowing to set vacuum in the embossing chamber 4 and the actuation chamber 5 simultaneously.

The embossing chamber 4 could be subjected to negative pressure with ambient pressure; atmospheric pressure distributed on its outer surface when the inside of the embossing chamber 4 is under medium vacuum, said medium vacuum being approximately in the range of 3×10$^3$ to 1×10$^{-1}$ Pa.

The frame of the embossing chamber 4 is configured to be able to sustain a pressure difference $P_{Atmospheric}-P_4$, $P_4$ is the pressure inside the embossing chamber 4.

Additionally, the frame of the embossing chamber 4 is configured to sustain the focalization of pressure forces applied through the molds 21 and 22 to the wall of the embossing chamber 4. More precisely, the embossing pressure on the counter-mold 22 during an embossing step with a maximal pressure difference between the actuation chamber 5 and the embossing chamber 4 should not result in dangerous strains and stresses in the walls of the embossing chamber 4. In particular, the apparatus 100 of the invention should be used with molds 21, 22 no smaller than a minimal size, having adjusted mechanical design, to avoid locally excessive pressure on the walls of the embossing chamber 4. In order to be safe in operation, the apparatus 100 of the invention typically comprises mechanical reinforcements and/or means for distributing the embossing pressure forces on the walls of the embossing chamber 4. Typical means include the positioning of plates between the mold 22 and the frame 41 of the embossing chamber 4 (not shown).

The actuation chamber 5 may be subjected to both positive and negative pressure differences between its inside, its outside surfaces comprised in the embossing chamber 4, and its outside surfaces exposed to the ambient air. Said inside pressure can be at pressures between atmospheric pressure and medium vacuum.

Therefore, the frame of the actuation chamber 5 is configured to be capable to sustain at least:

a negative pressure difference $P_{Atmospheric}-P_5$, $P_5$ being the pressure inside the actuation chamber 5, with its outer surfaces exposed to atmospheric pressure, a positive pressure difference $P_5-P_4$ where the pressure $P_5$ may be ambient pressure or higher and $P_4$ is a medium vacuum pressure with its outer surfaces exposed to the pressure in the embossing chamber 4.

The embossing chamber 4 and the actuation chamber 5 may be mechanically reinforced to sustain the above-mentioned pressure differences. Means for such a mechanical reinforcement may include the use of frame profiles and thick metal plates.

Further, the molding apparatus 100 may comprise mechanical locking and sealing means 81, 82 aimed at keeping it closed while the pressure inside the actuation chamber 5 is higher than the pressure inside the embossing chamber 4.

Mechanical locking means 81, 82 are preferably configured to be light and require low power actuators.

The mobile member 600 and mold assembly has a certain rigidity which allows to reach relatively high embossing pressure, without using fluid at higher pressure than ambient pressure. Indeed, the pressure difference between the two chambers is concentrated on the mold embossing surface, thus multiplying the pressure difference between the two chambers.

In one embodiment, the mold 21 and the embossing actuator 6, in particular the mobile member 600, have a weight below a predefined limit. For instance, they are configured to have a light weight compared to the pressure forces needed to maximize the reachable embossing pressure. It means that, in proportion, the weight per unit area of these pieces when combined is below 30%, preferably below 10%, of the pressure force applied to the embossing actuator 6 when the pressure difference between the two chambers is equal to 0.9 bar.

The rigid part or the mobile member 600 of the embossing actuator 6 may have an extent of flexibility along each of the six rigid movement axes of rotation and translation.

Setting vacuum in the embossing chamber 4 and the actuation chamber 5 simultaneously is a preliminary step to the embossing and allows to degas the embossing chamber 4 without yet applying a pressure difference which may result in pressurizing the mold 21, raw material 1, and counter-mold 22. This pressurization makes it possible to avoid the presence of trapped gas bubbles, which may interfere with the embossing process. As a variant, the actuation chamber 5 may be depressurized before the embossing chamber 4 in order to avoid that the embossing starts before the elimination of gas from the embossing chamber 4.

The chambers 4 and 5 comprise structural elements such as metal or alloy beams and plates assembled by any suitable means including fixture with screws or rivets, brackets, welding, and their combinations, among others. One advantage is to achieve depressurization resistance in ambient pressure.

Gas tightness of the two chambers 4, 5 may be achieved by any means adapted for this function, including welding, addition of joints such as toroidal joints, or deposition of joint material and any similar means.

Both chambers 4, 5 preferably comprise ports allowing their connection with gas, pressure or vacuum sources and/or sensors to allow embossing operations. The ports may be realized by through openings in the frame of each chamber 4, 5 and connecting means which cooperate with said openings.

According to one example, the apparatus of the invention may be configured to sustain at least 100 cycles of both chambers 4, 5 being simultaneously depressurized to a pressure inferior to 100 mbar and re-pressurized to the ambient pressure comprised between 900 and 1100 mbar.

Figure 2A:
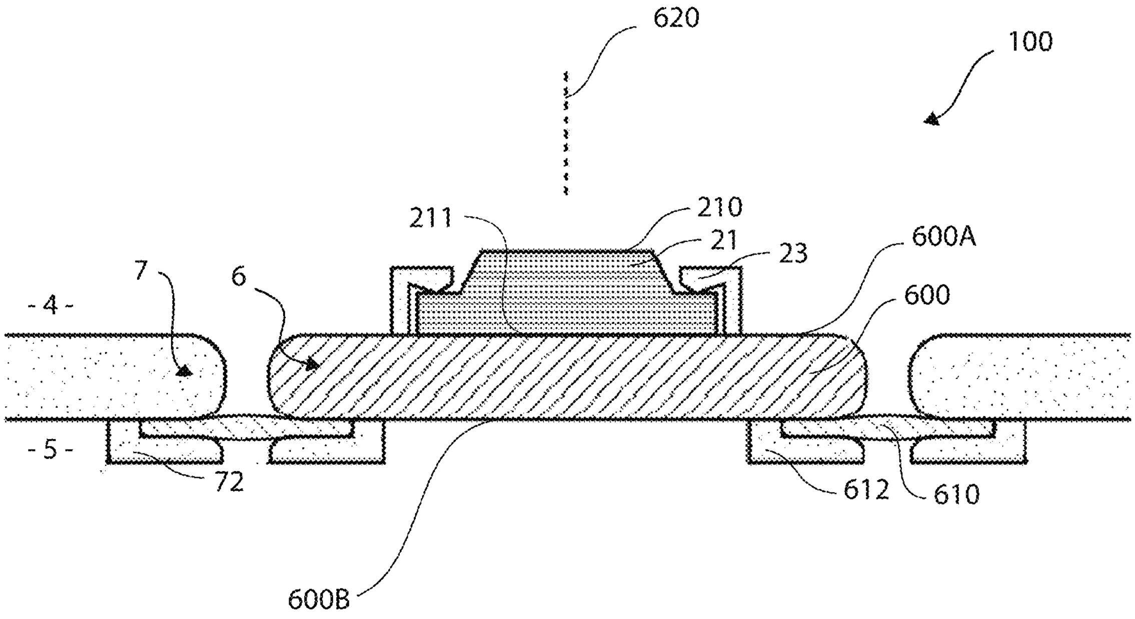
FIG. 2*a* is a schematic representation of a common wall separating two chambers of an apparatus according to one embodiment of the invention.

FIG. 2*a* illustrates a cross section of an embodiment where the embossing actuator 6 comprises a mobile member 600 and a joint 610 made of an elastomer membrane clamped to the common wall 7 by first clamping means 72 and to the mobile member 600 by second clamping means 612. The membrane 610 is symmetrically deformed, providing an appropriate arrangement, for example an arrangement with two planes of symmetry perpendicular two each other and to the plane of the common wall in order to ensure the direction movement of the mobile member 600 under pressure differential (embossing direction 620) is perpendicular to the plane of the common wall.

In this example, the joint 610 is clamped by a clamping force generated by the clamping means. In one example, the clamping means may be screwed on the mobile member 600.

According to another embodiment (not represented), the deformable part may comprise a flexible hinge having a first side attached to the fixed part of the common wall 7 and a second side attached to the mobile member 600. Such a flexible hinge is configured to be symmetrically deformed by the pressure difference between the two chambers 4, 5 in order to generate a movement of the mobile part 610 in the embossing direction 620.

In this example, the mold 21 is attached to the mobile member 600 by third clamping means 23.

The flexible joint 610 may have an elasticity and ductility sufficient for hot embossing operations up to 350° C. Heat resistant elastomer, such as silicone rubber or polyurethane, may be used. The width and thickness of the joint 610 are configured according to the target vertical displacement and the elasticity of the material.

Figure 2B:
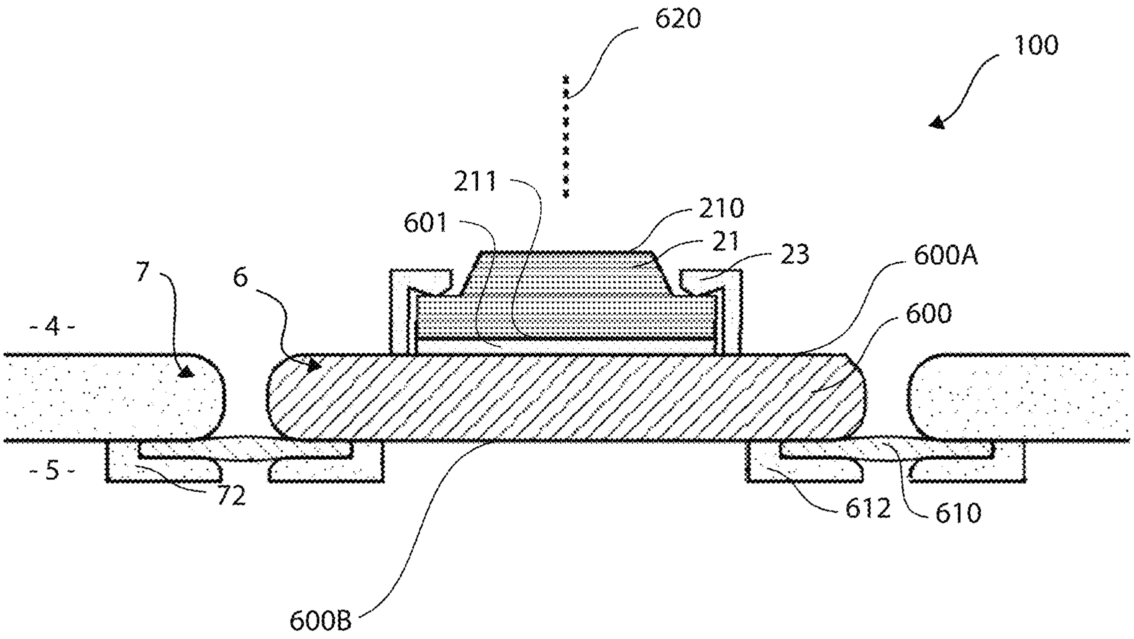
FIG. 2*b* is a variant of the embodiment of FIG. 3*a* comprising a deformable element for improving the alignment of molding.

FIG. 2*b* illustrates a variant of the embodiment of FIG. 2*a* where a deformable part 601, such as an elastomer sheet, is placed between the mobile member 600 and the connection surface of the mold 21 in order to avoid pressure concentration at mold edges. Such a deformable element 601 may also contribute to parallelism self-correction features of the invention as well. One advantage of this embodiment is to reduce or suppress the need for correction of alignment or parallelism of the mold 21 and counter-mold 22.

According to one embodiment which is compatible with the presence of a deformable element 601 and which is not represented, the embossing actuator 6 comprises a rotational flexibility along any axis perpendicular to the embossing direction. In such configuration, when a pressure difference is applied between the two chambers 4 and 5, the embossing actuator 6 may generate a rotation of the mold 21 allowing both surfaces 210 and 220 to become essentially parallel. The application of a pressure difference aims to delete any residual angle between the two surfaces 210, 220 of each mold. According to one example, a pressure difference between the two chambers 4 and 5 inferior to 200 mbar makes it possible to generate a parallelism between the two surfaces 210, 220. It is noted that it is preferable to perform such test with a layer of deformable material, e.g. an embossing material sheet 1, in order to avoid that the molds damage each other due to direct contact.

According to some embodiment, the embossing actuator 6 is configured to generate a large embossing movement amplitude with a moderate pressure differential between the two chambers 4, 5. Moreover, on the one hand, the materials of the embossing actuator 6 such as the flexible joint and the rigid plate and in the other hand the arrangement of pieces between them may be chosen and configured so that the embossing actuator 6 sustains a repetition of such large embossing movement amplitude to reduce the need for maintenance.

A configuration which can be used with the apparatus 100 of the invention is an embossing actuator 6 generating a minimal embossing cyclic movement of an amplitude of 2 mm for which the embossing chamber 4 is set at a pressure inferior to 10 mbar. In such example, the actuation chamber pressure is varied in a range comprised between the embossing chamber pressure and 500 mbar above said pressure at a rate inferior to 1 mbar per second. One advantage of this configuration is that a sufficient embossing distance is achievable for the manufacturing of parts with high or deep features.

One advantage of the invention is to reduce or suppress the need for correction of alignment or parallelism of the mold 21 and counter-mold 22.

Figure 3A:
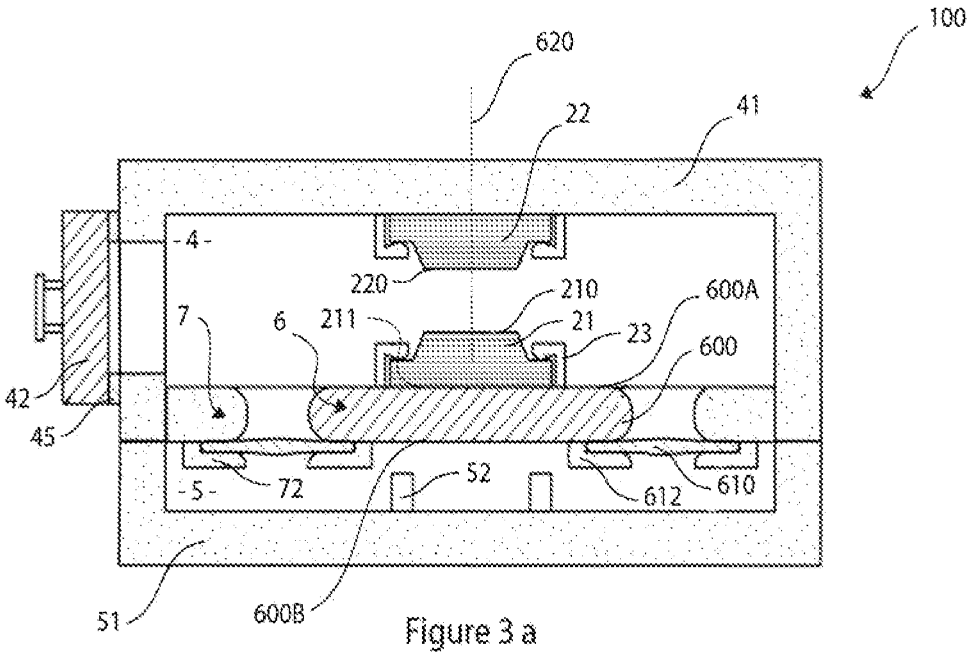
FIG. 3*a* is an example of an apparatus of the invention comprising a lateral door for accessing the embossing chamber.
Figure 5A:
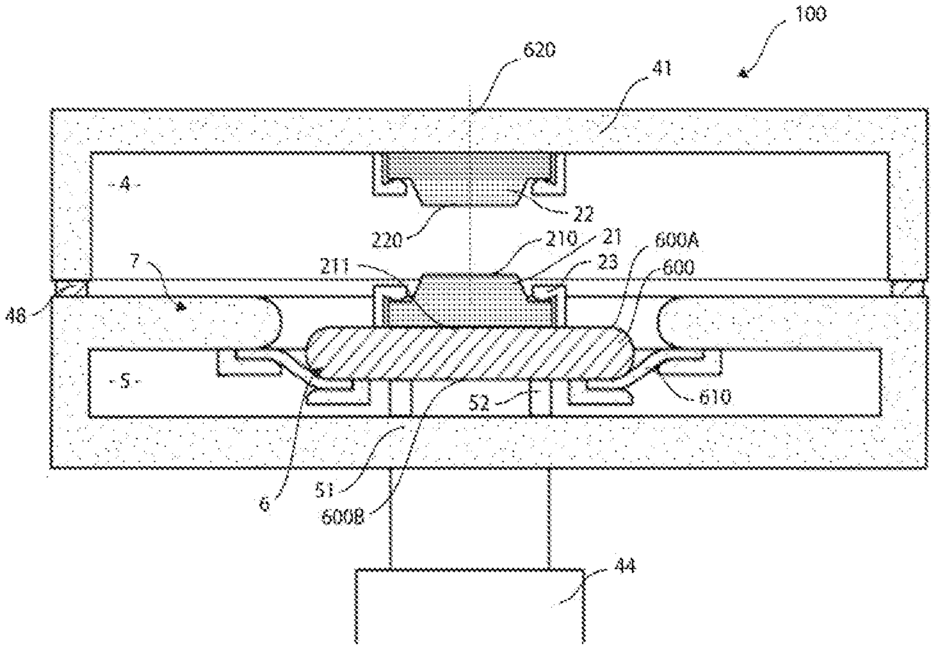
FIG. 5*a* is an example of an apparatus of the invention wherein the two chambers are separated by a junction ensuring that said chambers are sealed together.

FIGS. 3*a* and 5*a* represents chambers 4 and 5 with their respective first and second frames 41, 51. More precisely, the embossing chamber 4 displays a first frame 41 and the actuation chamber 5 displays a second frame 51. In this configuration, the upper mold 22 is integral with the frame 41 and the lower mold 21 is integral with the embossing actuator 6, connected to the first surface 600A of the mobile element 600 by its connection surface 211.

In this configuration, the apparatus 100 of the invention may comprise at least one mechanical stop 52 aiming to limit the movement of the embossing actuator 6 when said embossing actuator 6 goes back to his position after embossing a raw material 1. This may be done with contact pads attached to the second frame 51 of the actuation chamber 5. The contact pads act as embossing movement limiting parts 52.

Without any mechanical stop, in cases of low static resistance of the embossing actuator 6 to pressure, it may also move very significantly, and in a manner potentially causing damages to the embossing actuator 6, in particular to the joint 610, due to excessive deformation. Damages may occur under the weight of the embossing actuator 6 and the mold and other accessories attached to the embossing actuator 6. Therefore, it is advantageous to arrange a mechanical stop, as represented in FIGS. 3*a* and 5*a*, to protect exposed pieces during the movement of the embossing actuator 6.

According to one embodiment which may be combined with mechanical stop arrangement in the actuation chamber 5, a rest pressure difference might be maintained to counteract such weight forces and limit the displacement of the embossing actuator 6 toward the actuation chamber 5.

In the example of FIG. 3*a* and the example of FIG. 5*a*, the mold 22 is attached to the frame of the embossing chamber 4 by clamping means 23.

FIGS. 3*a* and 5*a* shows an example of an actuation chamber 5 comprising an opening that can be closed by a door 42. In the example of FIGS. 3*a* and 5*a*, the opening is designed in a lateral side of the frame of the embossing chamber 4 so that the raw material 1 may be arranged in the first region comprised between the upper mold 22 and the lower mold 21.

This configuration allows loading the raw material 1 and unloading the embossed material after embossing process. The door is opened before and after embossing operation(s) and the door is closed during embossing operations. According to one embodiment, the door 42 is a simple rotating and/or translating door. In a preferred embodiment, the opening is realized in a portion of the frame 41 of the embossing chamber 4, said portion being not realized in the common wall 7.

The door 42 and the opening are designed to ensure a gas tightness. A seal or joint 45 can be arranged around the opening to cooperate with the door 42 in order to minimize gas leaks. The gas tight joint 45 enabling gas tightness of the embossing chamber 4 may be a deformable membrane, for example made of silicone, or polyurethane foam, or O-ring situated between the door 42 and the embossing chamber walls.

In this embodiment, the opening is preferably large enough for loading and unloading the raw material 1 in the embossing chamber 4. The loading and unloading of the raw material 1 may be done by manual operations.

Figure 3B:
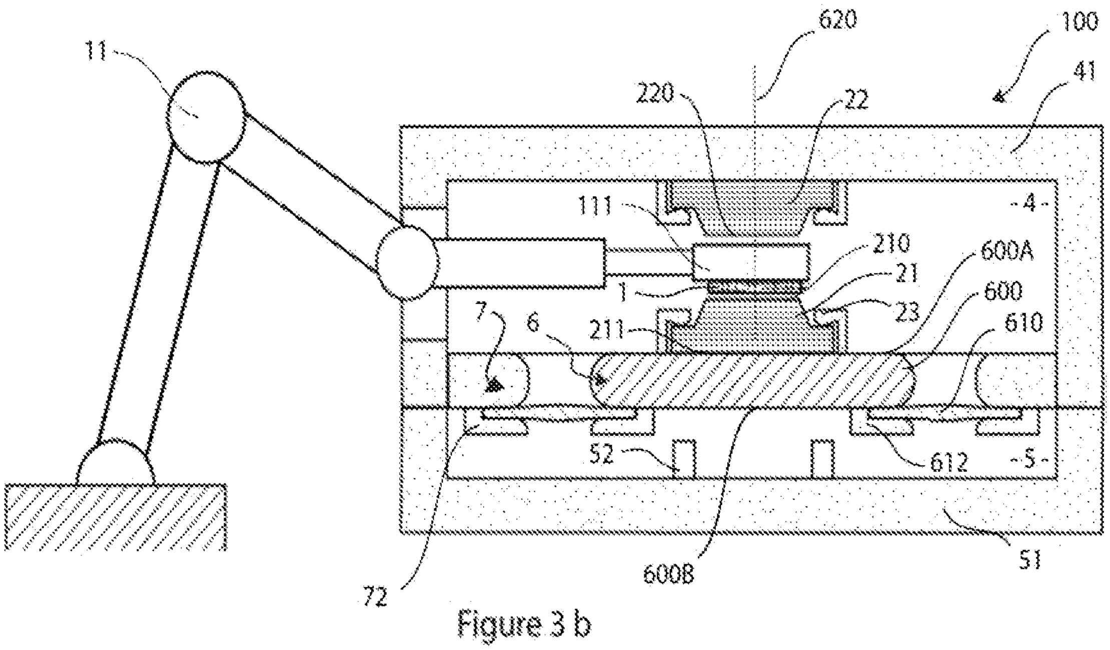
FIG. 3*b* is an example of an apparatus associated with a handling device for manipulating a raw material through the lateral door of FIG. 3*a*.
Figure 5B:
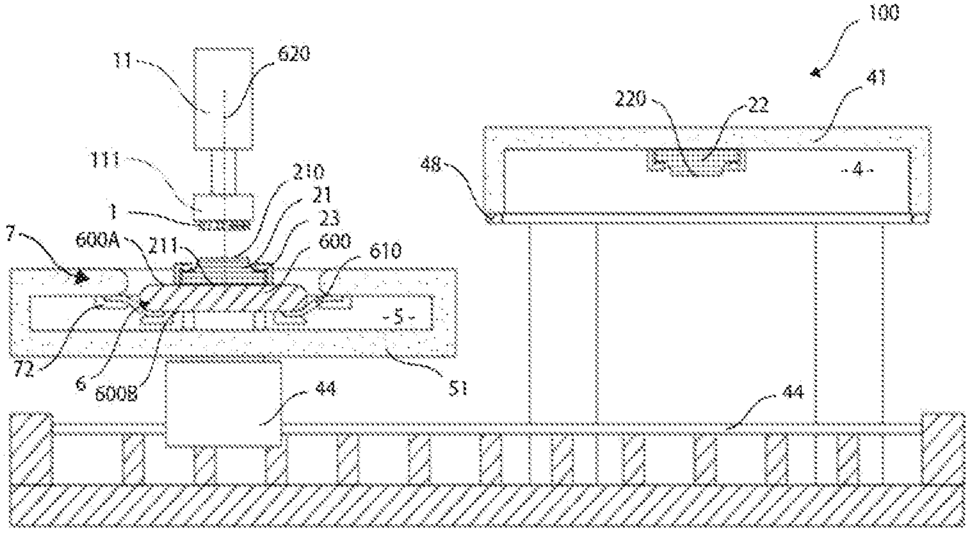
FIG. 5*b* is an example of an apparatus of FIG. 5*a* coupled with at least one linear guide and/or actuator for loading and unloading raw material in the embossing chamber.

FIGS. 3*b* and 5*b* represents an example of the apparatus 100 of the inventions of FIGS. 3*a* and 5*a* wherein loading and unloading operations are conducted by an electromechanical system 11 comprising linear and/or rotary actuators equipped with a raw material 1 handling tool.

Figure 4A:
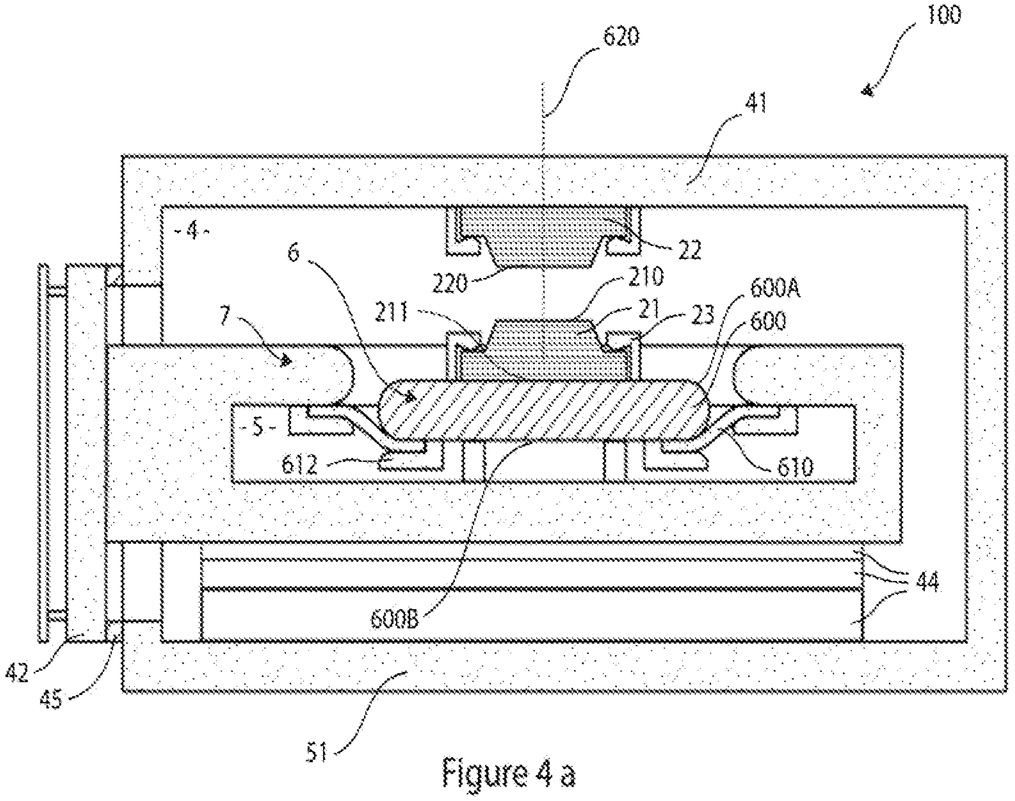
FIG. 4*a* is an example of an apparatus of the invention comprising a movable actuation chamber making it possible to load and unload raw material before and after embossing operations.

FIG. 4*a* illustrates another example of an embodiment of the invention. In this example, the actuation chamber 5 is integral with the door 42. In such configuration, the actuation chamber 5 and the second frame 51 may be attached to the door 42 or they may be parts of the door 42. Here too a joint 45 ensures gas tightness at the door junction with the frame 51.

In FIG. 4*a*, the actuation chamber 5 and the door 42 can be moved completely or partially out of the embossing chamber 4 cavity which facilitates access to the mold 21 to deposit or unload the raw material 1 respectively prior and after embossing. The common wall 7 which is integral with the second frame 51 of the actuating chamber 5 is sliding with the actuating chamber 5 outside of the cavity formed by the embossing chamber 4.

Figure 4B:
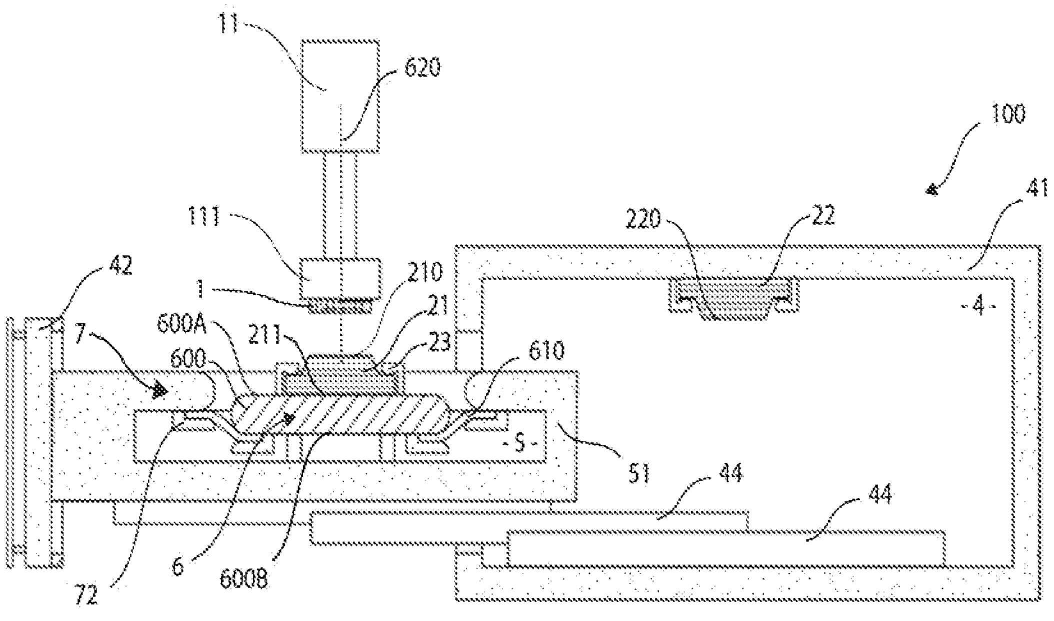
FIG. 4*b* is an example of the apparatus of FIG. 4*a* coupled with an electromechanical system comprising linear and/or rotary actuators equipped with a raw material handling tool.

When the actuation chamber 5 bears the lower mold 21 and the embossing chamber 4 bears the upper mold 22, said upper mold 22 being affixed to the apparatus frame, after embossing operations, the molded substrate is stuck to the moving lower mold 21 and thus, it could be detached from the lower mold in another stage. FIG. 4*b* illustrates a configuration where the actuating chamber 5 is extracted from the cavity formed by the embossing chamber 4. The corresponding movement is called the embossing chamber loading movement 43.

In this configuration, the movement of the door 42 and actuation chamber assembly is preferably a linear movement guided by linear guides. The movement allows the actuation chamber 5 to be translated horizontally.

In one of the embodiments illustrated in FIGS. 4*a*, 4*b*, the movement 43 is a linear movement along a direction perpendicular to the embossing direction 620.

In such cases, it may be found advantageous that the movement 43 amplitude be large enough to allow for a complete access to the mold surface along the embossing direction 620. One advantage is to facilitate loading and unloading of raw material 1 as illustrated in FIG. 4*b*.

Linear guiding or actuator 44 may be of the telescopic type.

The configuration where the door 42 and actuation chamber 5 are situated in the embossing chamber 4 allows dispatching the reaction of the embossing force on the actuation chamber 5 without resulting in a too high torque on the fixtures or guiding 44 of the actuation chamber 5 and door 42 or a too high mechanical stress concentration on the mobile parts. The actuator 44 cooperates with the second frame 51.

A simpler electromechanical system 11 than that described in FIGS. 3*b* and 5*b* may be used for loading/unloading and manipulating raw material/molded material. In this example, a raw material handling tool 111 is arranged so as to extract the molded material 1 from the mold 21.

FIGS. 5*a* and 5*b* illustrate another embodiment of an apparatus 100 of the invention. The two chambers 4 and 5 are separated by a junction 48, i.e. a connecting element forming a gas tight joint, and may be separated thanks to an actuator or a motor along the embossing direction. The junction may cooperate with the geometric sections of the embossing chamber 4 and the actuation chamber 5. The junction may be, for instance, a flexible membrane or an O-ring 48.

In this example, a preliminary movement 43' of the actuation chamber 5 along the embossing direction 620 is realized after or before an embossing operation. This movement is typically produced using linear guides and/or actuators. The movement 43' is advantageously limited in one or both directions by mechanical stops. This preliminary movement assembles/disassembles the embossing chamber at the junction 48. It additionally brings the mold and raw material to or away from the embossing position defined by alignment and proximity with the counter-mold 22. In this embodiment, when the embossing chamber 5 is disassembled and the counter-mold 22 is lowered following a movement 43' away from the second mold 22, the actuator 44 may engage a second linear movement 43 perpendicular to the embossing direction which may be facilitated by linear guides and/or actuators. The movement 43 is also advantageously limited in one or both directions by mechanical stops.

The advantage of the configuration illustrated in FIGS. 5*a* and 5*b* is that the generated embossing force is directly compensated by the pressure on the surface of the actuation chamber 5.

Another advantage of this configuration is that the actuator and/or guides may be positioned outside the embossing chamber 4 compared to the configuration of FIGS. 4*a* and 4*b*.

This arrangement allows reducing the volume of the embossing chamber 4. Consequently, it allows reducing the power consumption required to perform embossing cycles. The amplitude of the movement 43' is configured so that the mold 21 completely comes out of the embossing chamber 4 when the actuation chamber 5 is disengaged in the embossing direction.

Additionally, this arrangement reduces the difficulty to establish quick degassing and gas tightness, thanks to the fact that the number of components inside the embossing chamber is reduced as well as the associated number of required cable passages.

What is more, a stiffer and accordingly more accurate actuator 44 is achievable more easily and at a lower cost in these configurations.

In one embodiment the door 42, the actuation chamber 5 and its linear actuators and/or guides are mounted on a trolley moving on a rail as represented on FIG. 5*b*. In other examples, a linearly movable device may be used as a trolley. The movement of the trolley allows moving the actuation chamber 5 in a perpendicular direction to the embossing direction 620. Preferably, this movement has an amplitude which allows the access to the mold 21. One advantage is to facilitate loading and unloading of embossed material when the actuation chamber 5 is moved from its contact with the embossing chamber 4.

Of note, during operations, if the pressures in the embossing chamber 4 and the actuation chamber 5 remain equal or inferior to ambient pressure, the assembly and in particular the embossing chamber 4 is kept closed by itself. Thus, the overall chassis and the actuator 44 do not need to be as sturdy as in an ordinary press set-up, it only needs to be able to apply a force sufficient to lift the assembly attached to the actuation chamber 5 and to compress the junction 48 sufficiently to establish a gas-tight joint.

According to one embodiment, the method for embossing a raw material 1 comprises a step wherein the raw material 1 remains attached to the mold 21 at the end of embossing operation. One objective is to reduce the adherence of the molded material to the molds 21, 22. In that objective, the apparatus may be configured so as to overcome any adhesion problem. Indeed, one problem is that the molded material doesn't adhere with similar strength to both the mold and the counter-mold surface. In order to improve separation of the molded material 1 and to reduce risks of damages upon separation and to facilitate retrieval of the embossed material 1, one mold 21 or 22 is preferably having a higher aspect ratio geometric features, and/or a higher surface of contact with the raw material 1, and/or a higher friction coefficient with the raw material 1 than the other mold 21 or 22.

According to one embodiment, the raw material 1 may be maintained on the mold 21 for the duration of embossing by any means, including fixtures such as clamps, gluing, suction cups or pads. Such means may be arranged asymmetrically depending on the geometry of the two molds, in order to balance the forces maintaining the raw material 1 attached to the mold(s).

One advantage is to avoid deformation when the mold 21 is separated from the counter-mold 22.

Moreover, the adherence of the raw material 1 to the counter-mold may be diminished by any suitable means including smoothing its geometric features, using draft angle for vertical surfaces, polishing or creating non-fouling surface micro-structures, lubricating and other means which may be used in combination.

The apparatus 100 of the invention comprises embodiments particularly suited to perform high performance and low-cost hot embossing. According to one example, the raw material 1 may comprise thermoplastic material, such as COC, PMMA, LDPE, HDPE to facilitate their viscous flow and thus their deformation by the mold 21 and counter-mold 22 into a desired shape typically including a reproduction of mold structural features with a certain fidelity.

One advantage of hot embossing for such operations is its capability to reproduce features characterized by large ranges of dimensions with a predefined reproducible accuracy. Hot embossing of polymer according to the invention allows manufacturing polymer parts with higher aspect ratios and/or lower draft angle than typical injection molding means.

According to one embodiment, the frame of each chamber 4, 5, in particular the embossing chamber 4, may comprise optically transparent window. Alternatively, or in combination with the window, a remote visual feedback means such as a visible light or infrared light may be arranged inside or outside of a chamber 4, 5 to monitor the embossing process visually.

Figure 6:
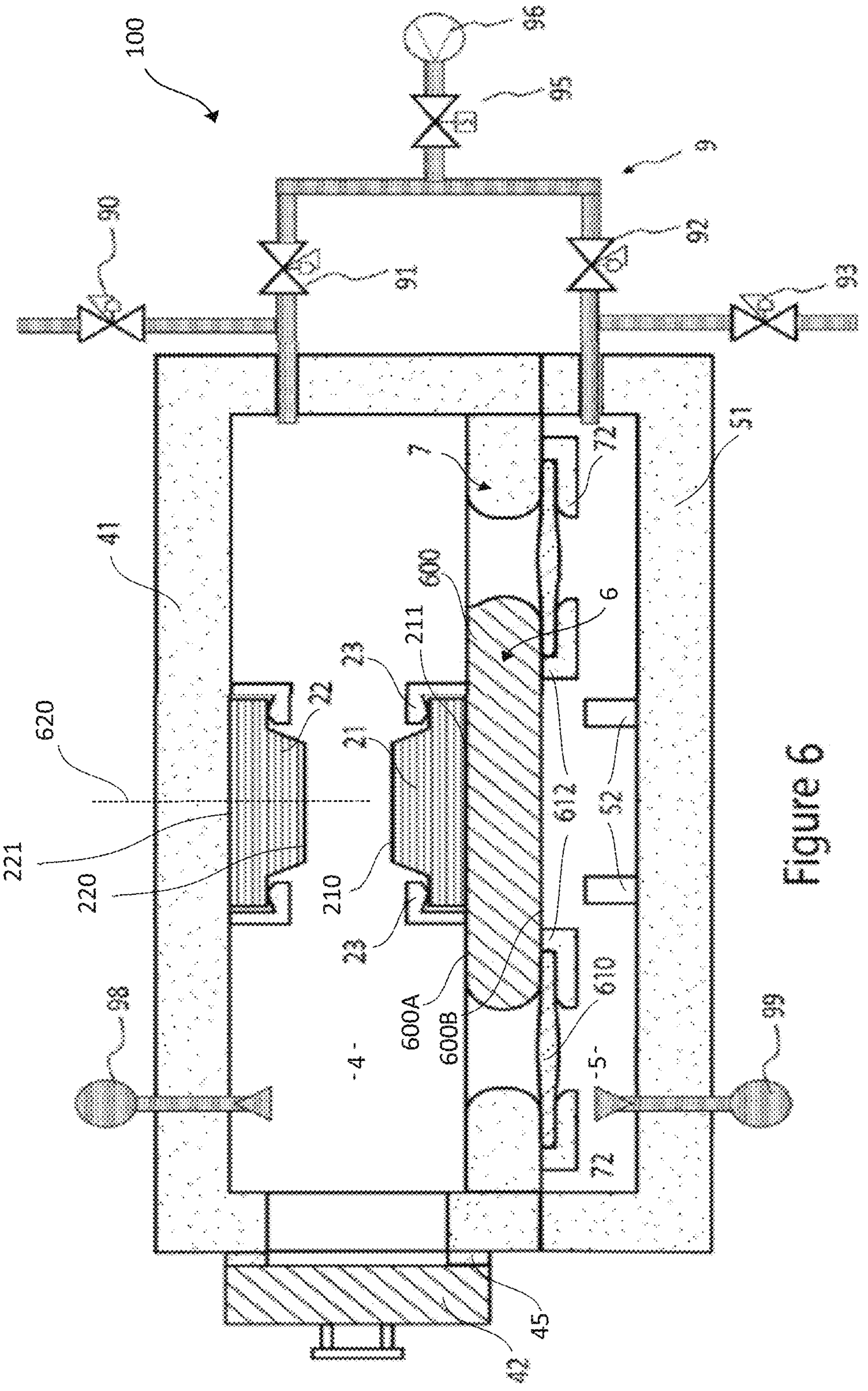
FIG. 6 is an example of an apparatus of the invention showing the pressurization system.

FIG. 6 represents an embodiment showing a pressurization system 9 allowing piloting and controlling gas pressure inside both chambers. The pressurization system 9 is illustrated through the examples of FIGS. 3*a* and 5*a*, but this pressurization system 9 may be coupled to any other embodiments of the invention.

The pressurization system 9 especially allows the following pressurization function depending on the mode of the apparatus of the invention:

- generating a depressurization of the embossing chamber 4, possibly until said embossing chamber is under vacuum, to eliminate residual air bubbles before an embossing operation;
- generating a pressure difference between the embossing chamber 4 and the actuation chamber 5 in order to activate the embossing actuator 6;
- generating a pressure close to the atmospheric pressure in at least one chamber when said at least one chamber is intended to be dissociated from the other chamber for loading or unloading raw material 1.

FIG. 6 shows some elements according to one example of the pressurization system 9. The pressurization system 9 comprises at least a first inlet allowing exchanging gas with the embossing chamber 4 and a second inlet allowing exchanging gas with the actuation chamber 5. The pressurization system 9 acts as a pneumatic circuit. The embossing chamber 4 and actuation chamber 5 are connected by said pneumatic circuit by two inlets.

The gas inlets are typically made of tapered holes in which adaptors are positioned, such as adaptors of the push-in, barbed end, male or female threads or rapid coupler types. Gas tightness can be facilitated by sealing elements such as a PTFE ribbon or tape positioned between the thread of the adaptor and of the tapered hole.

The pressurization system 9 comprises a combination of pressure regulators and electro-valve(s) to ensure the different pressurization functions of the apparatus of the invention.

In the example of FIG. 6, the pressurization system 9 comprises at least four valves:

- a valve 90 connecting the embossing chamber 4 to a pressure source allowing to increase the pressure of the embossing chamber 4;
- a valve 91 connecting the embossing chamber 4 to a vacuum source allowing to decrease the pressure of embossing chamber;
- a valve 92 connecting the actuation chamber 5 to a pressure source;
- a valve 93 connecting the actuation chamber 5 to a vacuum source.

The valves 90, 91, 92, 93 are preferably electro-valves or other types of remotely controllable valves, so that the system can be automated.

The valves 90, 91, 92, 93 preferably sustain vacuum in order not to interfere with the embossing process.

The valves 91 and 92 are preferably connected to the same vacuum source, such as a vacuum pump, to reduce the complexity of the complete system.

The valves 90 and 93 are typically connected to the atmosphere, playing the role of the pressure source. This has several advantages, including simplicity and the absence of risk of positive pressure difference between the actuation and embossing chambers on the one hand, and ambient pressure on the other hand, which reduces the required chassis sturdiness as well as operational risks. In alternative embodiments the valve 93 may be connected to a higher pressure source to allow higher pressure embossing.

All valves 90, 91, 92, 93 are preferably associated with regulating means for regulating the flow rate. This is desired in order to avoid inertial effects and in particular high-speed collision risks between components of the device as well as particularly high stresses related to fast pressurization or depressurization regimes or related acoustic effects. For example, one or several flow rate regulators may be installed between the chambers and the gas, pressure or vacuum source to limit the flow to chamber volumes. In some embodiments, these flow rate regulators are not necessary, due to intrinsic hydraulic resistance of pipes, lines, valves and other gas circulation components, depending of course notably on their cross-section dimensions and those of the constrictions that they may include.

The vacuum source or sources are preferably vacuum pumps or other types of vacuum sources capable of reaching a pressure inferior to 100 mbar in order to provide important embossing pressures. According to one example, a primary vacuum pump, such as a vane pump or a membrane pump, may be used. The vacuum level, such as low, medium, high, UHV, etc., has low incidence on the embossing force amplitude and homogeneity. However, the vacuum level allows to configure the amount of gas that may be trapped in the mold features and thus, on the molding fidelity. To emboss millimetric or micrometric features, medium vacuum may be sufficient. For nano-features imprinting, high vacuum may be preferable. High vacuum can be attained with a secondary pump, such as a turbomolecular pump, following the primary pump. Particularly low pressures are generally necessary when chemical damages due to gas pressure may occur, for example oxidation in hot embossing.

According to different embodiment, the pressure regulators may be piloted so that to operate simultaneously or successively.

According to the embodiment of FIG. 6, the pressurization system 9 comprises pressure sensors 98, 99 that are arranged respectively inside the embossing chamber 4 and the actuation chamber 5. They are preferably chosen to measure pressure down to $1.10^{-1}$ Pa, for most applications, and down to $1.10^{-7}$ Pa for nano-features imprinting. According to one example, pressure sensors comprises digital or analogical output allowing the automatization of the regulation functions.

According to one embodiment, the apparatus of the invention can easily be adapted to perform hot embossing and advantageously allows performing hot embossing at lower costs, with lighter and more compact equipment, with higher accuracy and with less need for correction of alignment and parallelism of the mold and counter-mold.

To this end, the device of the invention may be equipped with electronically controlled heating elements, such as an electrically resistive heater or a solid exchanger comprising circuitry for an externally heated fluid. This resistive heater is attached to a patterning part 2 being one of the mold 21 or counter-mold 22. Said heating element preferably deliver a relatively homogeneous heating to the patterning part 2 to which it is attached. A thermally conductive deformable layer ("thermal pad") may be placed between the heating element and the patterning part to which it is attached, in order to improve thermal contact and conduction. In embodiments where the heating element is an electrically resistive heater, its electric insulation should be ensured.

The heating element should be capable of heating the raw material 1 to a temperature of 50° C. when embossing pressure is applied. To enlarge the range of polymers which may be processed, higher temperatures should be reachable. The capability of reaching 100° C. is a minimum for many polymers but the capability to reach temperatures up to 150° C., 200° C. or 250° C. increases the versatility of the device. Many polymers are of interest due to their mechanical resistance at 134° C., which may allow their sterilization with steam. For such polymers, temperatures ranging between 150° C. and 250° C. may be necessary to obtain satisfactory embossing results under reasonable embossing pressure and in a reasonably short embossing time.

The apparatus 100 may comprise a first and a second heating element, the first heating element being coupled to the mold 21 and the second heating element being coupled to the counter-mold 22.

In practice, devices capable of achieving temperatures up to 200° C. or 250° C. are a good compromise in terms of versatility versus cost. The capability to reach temperatures up to 300° C. or even 350° C. allows the processing of particularly heat resistant polymers, which is of interest in particular for the manufacturing of parts intended for high temperature applications. Accordingly, the device of the invention may, in some embodiments, make it possible to heat up a raw material 1 up to temperatures higher than 300° C., or higher than 350° C.

A thermally insulating part is further preferably placed on the other side of the heating element to reduce thermal losses and increase mold temperature homogeneity. It is generally found preferable that another thermally insulating part be provided to isolate the other patterning part, i.e. the part not directly attached to the heating element, to further reduce thermal losses and allow more easily to heat the raw material homogeneously to target temperatures. Thermally insulating parts further protect other parts of the device from heat-related issues including thermal stresses, thermal deformations and temperature related acceleration of aging.

In these embodiments, a temperature sensor, preferably with an electronic analog or digital output, is attached to or near the mold to monitor the embossing temperature. Said sensor is advantageously connected to the controller controlling the heating element in a closed loop manner.

In some embodiments where hot embossing at extremely high temperature is sought, for example in order to hot-emboss glass or metal, particular embodiments of the device of the invention are capable of heating the raw material up to temperatures higher than 500° C., 750° C. or 1000° C., and where appropriate thermal insulation is used to avoid damages to parts of the device. In such embodiments, the invention provides the advantage of an easily obtained thermal insulation between embossing pressure sources, which are the vacuum pump source and the source of a higher pressure such as ambient air, and the embossed material. Additionally, the fact that the embossing is performed under vacuum with the device of the invention reduces and potentially suppresses degradation of materials and in particular of the raw material 1, mold 21 and counter mold 22 related to chemical alteration including oxidation at such high temperatures when exposed to gases and in particular $O_2$.

To improve hot embossing capabilities and in particular reduce embossing cycle duration, the device of the invention is further preferably equipped with means for cooling the raw material. In embodiments where the heating element is an exchanger comprising circuitry for an externally heated fluid, the cooling element may be obtained by adding means of cooling the fluid circulating the exchanger. In some such embodiments, two separate fluid circulation loops, one hot and one cold, can be alternatively connected to the exchanger with at least one pump allowing fluid circulation.

Heating thermal energy may be transmitted to the raw material 1 by conduction through the mold 21 and cooling thermal energy is transmitted by conduction through the counter-mold 22.

In other embodiments, a separate cooling element is attached to any of the patterning parts 2 between the mold 21 and the counter-mold 22. The cooling element(s) is/are preferably (an) exchangers connected to a cooling fluid loop which includes at least: a passively or actively cooled reservoir or an exchanger to cool the fluid; and a pump. In those cases, the apparatus 100 comprises a first and a second cooling elements, the first cooling element being coupled to the mold 21 and the second cooling element being coupled to the counter-mold 22.

According to one embodiment, the molding apparatus 100 is adapted for faster heating of the raw material 1 and a better control of the cooling on both sides of the embossed material in order to reduce warpage. In these embodiments, the molding apparatus 100 comprises two heating elements and two cooling elements, one of each being coupled to the mold 21 and one of each being coupled to the counter-mold 22. In those embodiments, both the mold 21 and the counter 22 mold are coupled to a cooling element and to a heating element. This way heating may be accelerated, i.e. the mold 21 and counter-mold 22 may be heated faster and without overheating the embossed material. This way, the cooling temperature profile on both sides of the embossed material, i.e. at the contact surface 210 between the mold 21 and the embossed material and at the contact surface between the counter-mold 22 and the embossed material, may be controlled. In particular, simultaneous cooling of both sides of the embossed material in a symmetrical or asymmetrical way, depending on the desired result, may lead to better controlling and typically reduce or suppress material warpage after cooling.

The heating thermal energy may be transmitted simultaneously by conduction through the mold 21 and the counter-mold 22 and the cooling thermal energy may be transmitted by conduction through the mold 21 and counter-mold 22.

In embodiments where a fluid is used for cooling or heating the raw material, the fluid should preferably be a gas, a supercritical fluid, or a liquid at a pressure higher than its vapor pressure at the higher temperature of the targeted range for hot-embossing operations. Low viscosity silicon oils are an example of possible fluids for uses at relatively high temperatures, which have the advantage of low toxicity. Other high temperature fluids such as Jarytherm BT06 commercialized by Arkema may be used to work at yet higher temperatures. Appropriate features for heated and/or pressurized fluid handling should be implemented in these embodiments to reduce accident risks.

In particular, temperature and pressure resistance should be tested with particular precautions prior to automated and unsupervised use of the device. All materials of fluidic circuitry should preferably withstand temperatures at least as high and preferably higher than the maximum embossing temperature. Any hot points in particular near the fluid heating element should be avoided or carefully assessed. Electric protection and other protections avoiding fluid or its vapor ignition by, for example, sparkles should be used. Expansion volumes are necessary for liquid and some fluids, and their filling should be monitored. They may further need to be passively or actively vented or cooled to avoid vapor ignition. In events where vapors may be toxic, appropriate filters should be connected to the vents to prevent atmospheric and operator contamination. In all events, care should be taken that during operations any fluid in the device of the invention or the raw material are not brought to temperature locally close to the self-ignition temperature, when applicable.

Additionally, in embodiments where a fluid is used for cooling or heating the raw material, one or several temperature and/or pressure sensors connected to alarms, and possibly to emergency switches capable to shut the device heating elements and pumps, are advantageously set up to monitor fluid pressure and/or temperature at key positions.

In all embodiments, the design of the assembly described above should sustain the targeted embossing pressures. In particular, the complete embossing stack comprising the mold, counter mold, heating elements, cooling elements and thermally and electrically insulating parts should withstand repeated cycles of pressures up to the upper limit of the embossing pressure range of the device. Typically, said complete stack should be configured to support embossing pressures of 10 bars.

Figure 7A:
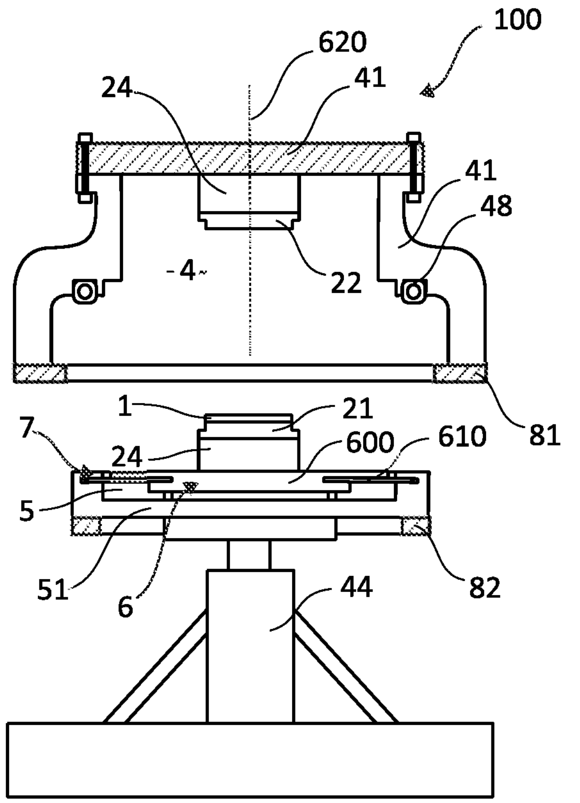
FIG. 7*a* is a schematic section view of an example of an apparatus according to the invention configured to allow high embossing pressure while maintaining easy access for material loading and unloading, in an open configuration.
Figure 7B:
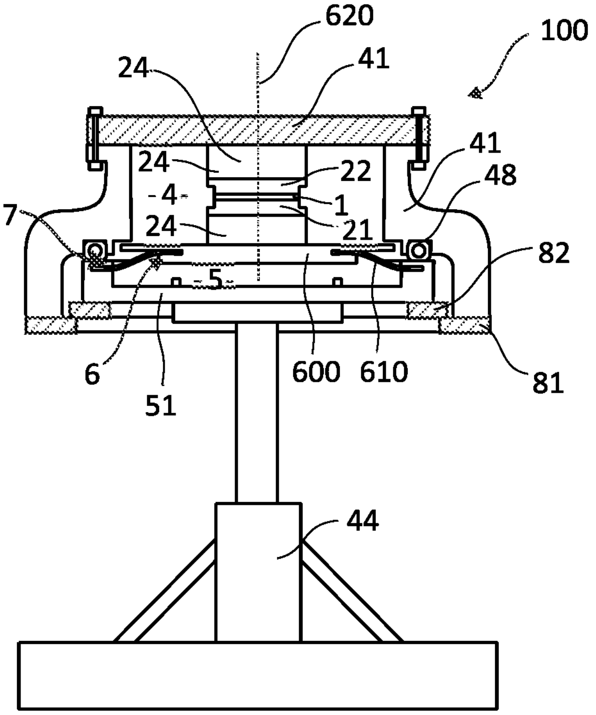
FIG. 7*b* is the apparatus example of FIG. 7*a* illustration in a closed configuration.

FIGS. 7*a* and 7*b* illustrate an embodiment of the apparatus 100 enabling a succession of fast embossing cycles thanks to higher embossing pressures and faster heating and cooling. In this embodiment the junction 48 is an inflatable joint 48 positioned between the common wall 7 and the embossing chamber frame 41 ensures embossing chamber 4 gas tightness in the closed configuration.

The two chambers 4, 5 are separated by the common wall 7 being part of the frame 51 of the actuation chamber 5. The actuation chamber 5 is moved away from the embossing chamber 4 by means of the actuator 44 along the embossing direction.

FIG. 7*a* shows this embodiment in an open configuration: the material loading and unloading configuration in which the chambers 4 and 5 are separated. FIGS. 7*b* shows the same embodiment in a closed configuration: the embossing configuration in which the chambers 4 and 5 are joined and where the inflatable joint 48 is inflated and ensures gas tightness of chamber 4.

This embodiment displays mechanical a first set of actuation locking means 81 attached to the actuation chamber frame 51 and a second set of embossing locking means 82 attached to the embossing chamber frame 41. These mechanical locking means 81, 82 are arranged to block the movement of the actuation chamber 5 away from the embossing chamber 4 in closed configuration by structural locking. These mechanical locking means 81, 82 are deployed in the embossing configuration depicted in FIG. 7*b* so that the actuation and embossing chambers 4 and 5 remain joined even when the actuation chamber pressure is at a pressure greater than atmospheric pressure. This enables higher embossing pressures to be used and allows faster flow of material in hot embossing.

For example, the actuation locking means 81 may be an annulus plate and the embossing locking mean 82 may be a set of radially arranged pins actuated to extend outward radially in order to join the annulus plate 81 in the locked configuration (see FIG. 7*b*).

Alternatively, the actuation locking mean 81 may be an annulus cog plate with inward teeth and the embossing locking mean 82 may be an annulus cog plat with outward teeth, both being designed so that in the angular configuration between both plates shown in figure a gear teeth of 81 and 82 are not superposed in projection along the embossing direction 620, and so that gear teeth of 81 and 82 are significantly superposed to transmit pressure forces during embossing in the angular configuration between both plates shown in FIG. 7*b*. In this alternative it is preferably the cog plate 82 which is actuated to rotate around the embossing direction by a small angle between both configurations.

In this embodiment, the locking means 81 and 82 requirements are reduced by using an inflatable joint 48 as junction to seal the embossing chamber 4 in the configuration shown in FIG. 7*b*. The use of the inflatable joint removes the need the locking means to additionally press a joint between chambers 4 and 5 to obtain gas tightness. Additionally, the inflatable joint better compensates distances and geometrical defects between the first frame 41 and the common wall 7 which further reduces geometric tolerance requirements for locking means 81, 82 and generally for the apparatus 100 manufacturing. In use, the inflatable joint is inflated after the locking means 81, 82 are in the locked configuration and deflated prior to the movement of the locking means to the unlocked configuration.

This embodiment also displays a mechanical stop formed by a protrusion of the embossing chamber frame 41 cooperating with a radial extension of the mobile member 600. This radial extension aims at limiting the possible movement of the mobile member 600 to avoid accidental deterioration of the deformable part 610, of the mold 21 and of the counter-mold 22.

The mold 21 and counter-mold 22 are each attached to a temperature control module 24 allowing to individually control the temperature of the mold 21 and the temperature of the counter-mold 22. This configuration allows faster heating (by heating both sides of the raw material 1) without overheating the embossed material. It also enables a better material warpage control after embossing. Heat exchange fluid piping (not represented) connected to the temperature control module 24 of the mold 21 and connected to external thermal exchange units is routed through the mobile member 600 and the actuation chamber frame 51 with flexible section between both of these passages to preserve the mobility of the mobile member.

The top part of the embossing chamber frame 41 may be disassembled to replace the counter-mold 22 or maintain the system.

This embodiment displays a design based on revolution shapes to optimize force distribution and mechanical strength. In particular, the apparatus 100 is configured to sustain use in embossing configuration with a pressure, inside the actuation chamber 5, greater than atmospheric pressure, comprised within 10 bars and 10 mbar.

The rigidity of the plate 600 and its surface ratio to the mold 21 and counter mold 22 surfaces in projection along the embossing axis 620, allows high embossing pressures. For example, if the surface ratio is of 5 or 10, the pressure in the actuation chamber 5 is 10 bars, and nearly 0 bars in the embossing chamber 4, embossing pressures of about 50 or 100 bars may be reached between the mold 21 and the counter-mold 22.

Method

Figure 8:
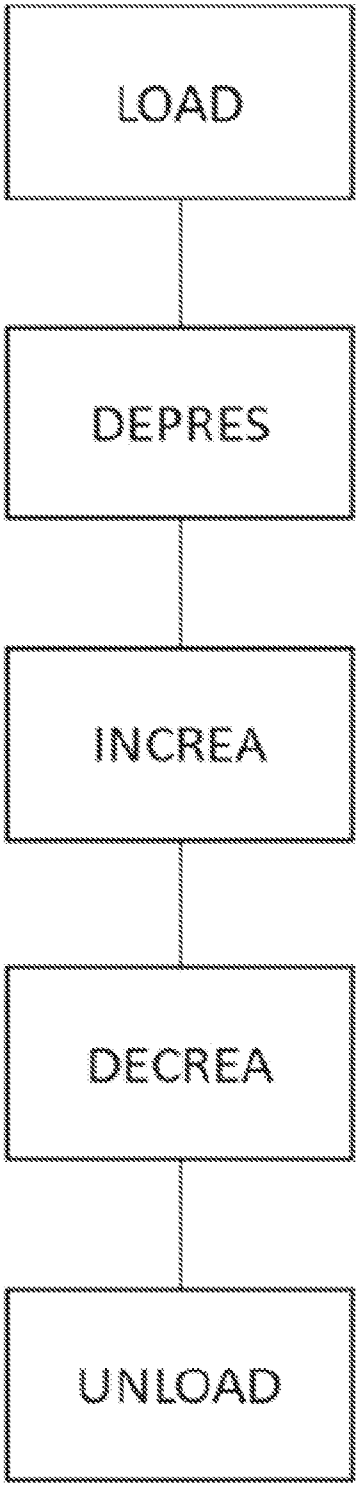
FIG. 8 is an example of steps implemented by the method according to the invention.

The invention is also directed to a method of using an apparatus according to the invention for embossing a raw material 1 in order to produce a molded material. FIG. 8 represents the main steps of an example of a method according to the invention. The method according to the invention take advantage of the features of the apparatus of the invention by using two chambers sharing a common wall 7 having an embossing actuator 6.

According to one embodiment, the method according to the invention comprises the following steps, steps may be successive steps or simultaneous steps and may be separated by intermediary steps.

The method comprises a step where a raw material 1 is loaded on top of the mold 21, this step is noted LOAD in FIG. 8. In one example the raw material 1 may be a thermoplastic substrate. The loading step may comprise a specific alignment of the thermoplastic material on the mold 21. This step should result in an association of the lower and upper chamber 4, 5 for example by means for sealing together the two chambers 4, 5.

One optional step of depressurization may be implemented if the actuation chamber pressure is greater than 50 mbar. This step is noted DEPRES in FIG. 8. In that case, the pressure in the actuation chamber 5 is reduced to a value inferior to 50 mbar.

Advantageously, the method comprises a step where the pressure in the embossing chamber 4 is reduced to a value inferior to 50 mbar.

According to one example, a gas communication is established at this stage between the embossing chamber 4 and the actuation chamber 5 in order to equal their pressure. This may be performed by opening simultaneously the valves 91 and 92 in configurations where they are linked. According to one embodiment, when the embossing chamber 4 and the actuation chamber 5 are sealed, the top surface of the raw material 1 is arranged to be significantly closer to the bottom surface of the upper mold 22 than the vertical displacement allowed by the embossing actuator 6.

The method comprises a step where the actuation chamber pressure is increased to a value superior of that of the embossing chamber, said value being chosen to reach a more or less important embossing force This step is noted INCREA in FIG. 8. Typical values being comprised between 100 mbar, and said pressure being inferior to 1 bar or to the ambient pressure.

In another embodiment, the value of the pressure to which the inside of the actuation chamber 5 is brought to during the INCREA step, is greater than ambient pressure, for example comprised between 1 and 10 bars.

For example, pressure sources, electro-valves and other components of the pressure control system 9 may be configured to pump air in the embossing chamber 4 and isolate the actuation chamber 5. In particular, the valve 93 may be opened in order to slowly establish atmospheric pressure in the said actuation chamber 5. The method comprises applying a predefined pressure differential until a setting point is reached. The method comprises slowly applying a compressive force to the raw material substrate by means of the molds. With an optional heating procedure during this step, the method results in slowly embossing the raw material 1. This step may be conducted during heating the raw material 1.

In some embodiments, a predefined pressure differential is applied for a given amount of time where the raw material 1 is heated. Thus, the polymer of the raw material 1 flows in the mold features.

For hot-embossing processes, the heating step where the raw material 1 is heated is preferably realized after an embossing force is generated in the INCREA step.

In this step, a heating device may be turned on in order to bring the thermoplastic substrate at a setpoint temperature. When the raw material 1 has flown inside the features of the mold 21 and the counter-mold 22, the heating devices are stopped and the cooling devices are started. Thus, the method comprises a cooling step. In that case, the raw material 1 is preferably cooled prior to depressurization. The method allows cooling the thermoplastic substrate to room temperature or at least to its heat deflection temperature. Once the thermoplastic substrate has cooled enough, the lower and upper chamber are separated, for example by means of the embossing actuator 6.

In some embodiments, the cooling devices, and optionally the heating devices, might be activated based on mold 21 and counter-mold 22 temperature measurements with feedback loops in order to apply specific temperature profile on each side, and eventually in an even more spatially resolved manner, of the embossed material during the cooling step. This control may allow control material warpage.

The method comprises a step where the actuation chamber pressure is reduced to a value equal or inferior to the pressure of the embossing chamber 4. This step is noted DECREA. The method also comprises a step where the embossing chamber pressure is increased to the ambient pressure. The method comprises an optional step where the actuation chamber is increased to the ambient pressure. One advantage is to allow the separation of the two chambers 4, 5 in conditions where the external pressure is approximately the atmospheric pressure, thus limiting the required opening force. This configuration aims to limit the shocks due to a pressure surge caused by a large pressure differential between the external pressure and the pressure inside one of the embossing chamber 4 or the actuation chamber 5.

According to the aforementioned example, the thermoplastic substrate 1 is ready to be unmolded, for example, by a suction pad array on a second stage of the apparatus of the invention. This step is noted UNLOAD in FIG. 8.

Thus, a final step where the raw material 1 is retrieved may be conducted.

In partly or completely automated embodiments, some or all of these steps may be controlled electronically The invention solves the technical problem relating to the manufacturing of micro-devices by ensuring:

- that gas does not perturb the molding by gas bubble trapping or oxidation, in particular with a capability for degassing prior to pressurization initiation between molded material and molds,
- an homogeneous process in terms of temperature and pressure in the substrate in particular thanks to a self-correction of parallelism of the mobile member,
- to reach sufficiently high embossing pressure while maintaining an easy loading and unloading of the molded material with a sober system, much simpler, smaller and cheaper than an ordinary press setup, which results in improved throughput, reduced costs and amenability to complete automation.

As a result, the invention provides an apparatus for high performance manufacturing of micro-devices with consistent and high-quality output, high throughput and minimized initial and operating costs.

The invention claimed is:

1. A molding apparatus for manufacturing a molded article from a raw material intended to be arranged in a first region of an embossing chamber of said molding apparatus,

- said embossing chamber presents a first frame and comprising a mold and a counter-mold, the mold and counter-mold being arranged on two opposite sides of the first region, the mold being mobile along an embossing axis within the embossing chamber,
- wherein the molding apparatus comprises an actuation chamber displaying a second frame and having a common wall with the embossing chamber, the common wall being part of the second frame and separating the embossing chamber from the actuation chamber,
- wherein both the embossing chamber and the actuation chamber are gas tight,
- wherein both the embossing chamber and the actuation chamber are made of a rigid sturdy material, the common wall of the embossing chamber and the actuation chamber consisting of the rigid sturdy material, the first frame being configured to sustain a pressure difference $P_{atmosphere}-P_4$, and the second frame being configured to be able to simultaneously sustain:
  - a negative pressure difference $P_{atmosphere}-P_5$, where $P_5$ may be ambient pressure or higher on an inside surface, and
  - a positive pressure difference $P_5-P_4$ on an outside surface, both the embossing chamber and the actuation chamber being configured to, both simultaneously, sustain and maintain low inside pressures or inside vacuum, said low inside pressure ranging from atmospheric pressure to vacuum,

- wherein the molding apparatus further comprises a pressurization system configured to generate a predefined pressure differential between the embossing chamber and the actuation chamber,
- wherein said common wall comprises an opening in which at least one embossing actuator is positioned, said embossing actuator comprising a mobile member and at least one deformable part, said mobile member positioned entirely within a perimeter of the opening in a plane of said common wall, said mobile member being a rigid plate displaying a first surface which is part of the embossing chamber and is connected to the mold and a second surface, opposite to the first surface, which is part of the actuation chamber, the embossing actuator being configured to generate a movement of the mold so as to mold the raw material when a predefined pressure differential is applied between the embossing chamber and the actuation chamber and said deformable part being deformed by the application of the predefined pressure differential and allowing a movement of the mobile member, said at least one deformable part being arranged so as to provide a parallelism self-correction function of at least one of the mold and the counter-mold, the movement of the mold provided by the embossing actuator moving or deforming at least one element linked to the common wall from a first state to a second state to supply an embossing force to the raw material within the embossing chamber to form the molded article, and
- wherein the mold displays a molding surface aimed at cooperating with the counter-mold during the molding of the raw material and a connection surface connected to the first surface of the embossing element, the molding surface of the mold projected along the embossing axis being smaller than the second surface of the embossing actuator projected along the same embossing axis.

2. The molding apparatus according to claim 1, wherein the molding apparatus comprises mechanical locking and sealing means aimed at keeping the apparatus closed while the pressure inside the actuation chamber is higher than the pressure inside the embossing chamber.

3. The molding apparatus according claim 2, wherein the sealing means comprise an inflatable joint.

4. The molding apparatus according to claim 1, wherein an embossing pressure exerted by the mold on the counter-mold during an embossing is greater than 5 bars.

5. The molding apparatus according to claim 1, wherein an actuation system enables the movement of the actuation chamber in a position where the mold it is not facing the counter-mold along the embossing direction and thus enables an easier recovery of the molded articles by an access along the embossing direction.

6. The molding apparatus according to claim 1, wherein the embossing actuator comprises clamping means allowing to keep the mold integral with the mobile member.

7. The molding apparatus according to claim 1, comprising:

a heating element configured to transfer thermal energy to the raw material; and a cooling element configured to absorb thermal energy from the raw material.

8. The molding apparatus according to claim 7, wherein the apparatus comprises a first and a second heating element, the first heating element being coupled to the mold and the second heating element being coupled to the counter-mold.

9. The molding apparatus according to claim 7, wherein the apparatus comprises a first and a second cooling element, the first cooling element being coupled to the mold and the second cooling element being coupled to the counter-mold.

10. The molding apparatus according to claim 7, wherein heating thermal energy is transmitted simultaneously by conduction through the mold and the counter-mold and cooling thermal energy is transmitted by conduction through the mold and counter-mold.

11. The molding apparatus according to claim 1, wherein the embossing chamber displays a first frame and the actuation chamber displays a second frame, the mold being affixed to the first frame and the counter-mold being affixed to the second frame, the apparatus comprising a thermal insulation between the mold and counter-mold and the frames to which they are respectively affixed.

12. The apparatus according to claim 1, wherein an embossing pressure exerted by the mold on the counter-mold during an embossing is greater than 20 bars.

13. The apparatus according to claim 1, wherein an embossing pressure exerted by the mold on the counter-mold during an embossing is greater than 50 bars.

14. A method for embossing a raw material by means of the molding apparatus according to claim 1, said method comprising the following steps:

loading a raw material on the top of the surface of a first mold, said first mold being arranged in an actuation chamber, said actuation chamber comprising a common wall with an embossing chamber;

depressurizing the actuation chamber when the pressure in the actuation chamber is greater than a predefined threshold;

depressurizing the embossing chamber when the pressure in the embossing chamber is greater than a predefined threshold;

increasing the pressure in the actuation chamber until it reaches a predefined limit, said predefined limit being superior to the pressure in the embossing chamber, said predefined limit being configured to generate a predefined embossing force;

decreasing the pressure in the actuation chamber to a value equal or inferior to the pressure in the embossing chamber;

increasing the pressure in the embossing chamber until it reaches the ambient pressure;

unloading molded material from the first mold.

15. The method according to claim 14, comprising setting the predefined limit between a first range of 100 mbar and 1 bar or between a second range of 100 mbar and the ambient pressure.

16. The method according to claim 14, comprising:

a heating step wherein the raw material is heated before the depressurization step of the embossing chamber; and a cooling step wherein the raw material is cooled after the heating step.

17. The method according to claim 14, comprising increasing the pressure in the actuation chamber until it reaches the ambient pressure; before unloading.

* * * * *